(12) United States Patent
Konno et al.

(10) Patent No.: US 8,943,786 B2
(45) Date of Patent: Feb. 3, 2015

(54) PACKAGING AND FILLING MACHINE

(75) Inventors: Hidetoshi Konno, Tokyo (JP); Yutaka Kaneko, Tokyo (JP); Keiji Yano, Tokyo (JP)

(73) Assignee: Tetra Laval Holdings & Finance S.A., Pully (CH)

( * ) Notice: Subject to any disclaimer, the term of this patent is extended or adjusted under 35 U.S.C. 154(b) by 1057 days.

(21) Appl. No.: 12/991,963

(22) PCT Filed: May 5, 2009

(86) PCT No.: PCT/JP2009/001991
§ 371 (c)(1),
(2), (4) Date: Dec. 28, 2010

(87) PCT Pub. No.: WO2009/139128
PCT Pub. Date: Nov. 19, 2009

(65) Prior Publication Data
US 2011/0185686 A1 Aug. 4, 2011

(30) Foreign Application Priority Data

May 11, 2008 (JP) .................................. 2008-124114
Dec. 24, 2008 (JP) .................................. 2008-327883
Dec. 25, 2008 (JP) .................................. 2008-330013
Dec. 26, 2008 (JP) .................................. 2008-331919

(51) Int. Cl.
*B65B 3/30* (2006.01)
*B65B 61/28* (2006.01)
(Continued)

(52) U.S. Cl.
CPC ................. *B65B 61/28* (2013.01); *B29C 65/02* (2013.01); *B29C 65/7451* (2013.01);
(Continued)

(58) Field of Classification Search
USPC ........................... 53/52, 111 R, 503, 511, 545
See application file for complete search history.

(56) References Cited

U.S. PATENT DOCUMENTS 3,269,079 A * 8/1966 Schmied .......................... 53/426
3,854,874 A * 12/1974 Loliger et al. ................. 422/299
(Continued)

FOREIGN PATENT DOCUMENTS

JP   1-82102 U   6/1989
JP   2-269623 A   11/1990
(Continued)

OTHER PUBLICATIONS

*International Search Report (PCT/ISA/210) issued on Jul. 21, 2009, by Japanese Patent Office as the International Searching Authority for International Application No. PCT/JP2009/001991.

*Primary Examiner* — Gloria R Weeks
(74) *Attorney, Agent, or Firm* — Buchanan Ingersoll & Rooney PC

(57) ABSTRACT

A packaging and filling machine that is capable of easily preforming with the forming flaps by keeping the pressure of the filled liquid food in the tube at positive pressure, capable of preventing the pressure of the liquid food from dropping to negative pressure, even if the pressure of the liquid food decreases due to the change in the liquid food pressure, and capable of preventing outside atmosphere materials from invading into the tube.

A pressure flange fixed on a periphery of the filling pipe absorbs fluctuation of the pressure of the liquid food in the tube below the pressure flange, and prevents the liquid food pressure from dropping to negative pressure to keep the pressure of the liquid food in the tube below the pressure flange at a positive pressure.

8 Claims, 10 Drawing Sheets

(51) Int. Cl.
  *B29C 65/02* (2006.01)
  *B29C 65/74* (2006.01)
  *B29C 65/00* (2006.01)
  *B65B 9/12* (2006.01)
  *B65B 9/20* (2012.01)
  *B65B 9/22* (2006.01)
  *B65B 51/30* (2006.01)
  *B65B 57/14* (2006.01)
  *B29C 53/48* (2006.01)
  *B29C 65/08* (2006.01)
  *B29C 65/18* (2006.01)
  *B29C 35/04* (2006.01)
  *B29K 305/02* (2006.01)
  *B29K 711/12* (2006.01)
  *B29L 9/00* (2006.01)
  *B65B 61/24* (2006.01)

(52) U.S. Cl.
  CPC ........ *B29C 66/1122* (2013.01); *B29C 66/4312* (2013.01); *B29C 66/7373* (2013.01); *B29C 66/8491* (2013.01); *B65B 9/12* (2013.01); *B65B 9/20* (2013.01); *B65B 9/2035* (2013.01); *B65B 9/22* (2013.01); *B65B 51/30* (2013.01); *B65B 57/145* (2013.01); *B29C 66/81427* (2013.01); *B29C 66/81431* (2013.01); *B29C 53/48* (2013.01); *B29C 65/08* (2013.01); *B29C 65/18* (2013.01); *B29C 66/024* (2013.01); *B29C 66/0242* (2013.01); *B29C 66/92* (2013.01); *B29C 66/92921* (2013.01); *B29C 2035/046* (2013.01); *B29C 2793/009* (2013.01); *B29K 2023/06* (2013.01); *B29K 2305/02* (2013.01); *B29K 2711/123* (2013.01); *B29K 2995/0067* (2013.01); *B29L 2009/00* (2013.01); *B29L 2009/003* (2013.01); *B65B 61/24* (2013.01); *B29C 66/83543* (2013.01)
  USPC .............................................. 53/503; 53/511

(56) References Cited

U.S. PATENT DOCUMENTS

| | | | | |
|---|---|---|---|---|
| 4,218,265 | A | * | 8/1980 | Fuchs et al. ..................... 134/18 |
| 4,617,779 | A | * | 10/1986 | Nygren et al. .................. 53/433 |
| 4,641,486 | A | * | 2/1987 | Zannoni ......................... 53/433 |
| 4,747,253 | A | * | 5/1988 | Schulte ........................... 53/433 |
| 4,750,534 | A | * | 6/1988 | Hirasawa et al. ............. 141/114 |
| 4,769,974 | A | * | 9/1988 | Davis .............................. 53/433 |
| 4,809,485 | A | * | 3/1989 | Nielsen ........................... 53/503 |
| 4,958,665 | A | | 9/1990 | Iwano |
| 5,044,140 | A | | 9/1991 | Iwano et al. |
| 6,035,614 | A | | 3/2000 | Gustafsson et al. |
| 2001/0047641 | A1 | | 12/2001 | Kume et al. |
| 2011/0099955 | A1 | * | 5/2011 | Konno et al. .................. 53/545 |
| 2011/0154779 | A1 | * | 6/2011 | Baba et al. .................. 53/111 R |

FOREIGN PATENT DOCUMENTS

| | | |
|---|---|---|
| JP | 11-49105 A | 2/1999 |
| JP | 2001-322604 A | 11/2001 |

* cited by examiner (A)        (B)        (C)

(A)   (B)

PACKAGING AND FILLING MACHINE

FIELD OF THE INVENTION

This invention relates to a packaging and filling machine to fill and pack something to drink in containers.

BACKGROUND ART

When packaged containers filled up with liquid food such as milk, mineral water, tea, juice, soup, or alcohol are manufactured, a web-shaped laminated packaging material is used. The web-like packaging laminated material is spliced in splices of the next packaging laminated material. A packaged container is formed by continually sealing the packaging laminated material with heat-sealing, ultrasonic sealing and the like.

For example, in a packaging and filling machine, a packaging laminated material is spliced in a splice of the next packaging laminated material. A strip is joined continually at the edge of the packaging laminated material. The packaging laminated material is formed into a tube-shaped shape. Both end sides of the packaging material are overlaid on each other to form an overlap. The overlap is pressed by a strip covering an inner edge section face of longitudinal sealing, and the overlap is sealed with a longitudinal seal element along the longitudinal direction. In the aseptically covering atmosphere in an aseptic chamber, a packaging laminated material is sealed in transverse direction by a transversal seal device while filling up liquid food in the tube-shaped packaging laminated material, and the packaging laminated material is cut. A pillow-shaped preliminary container is formed. A preliminary container is further formed into the predetermined shape, and a packaged container is completed.

FIG. 4 is an outline perspective diagram showing an example of a packaging and filling machine. A reel-like, web-shaped packaging laminated material 1 is loaded into the packaging and filling machine. The packaging laminated material 1 comprises a flexible laminate laminating a paper substrate and polyethylene resin layers on both sides of the paper substrate. A barrier layer including aluminum foil, gas barrier resin and the like is formed between the paper substrate and the film layer, if necessary.

Decorations are printed on sections corresponding to the surface of packaged container 14.

The unwound packaging laminated material 1 is transported continually with a feeder of the transporting means, and is transported to a strip applicator 3 through bending rollers, and damper rollers. With splicing of the next strip, a strip 2 is continually applied onto one edge of the packaging laminated material 1 by a strip applicator.

A pull-tab is applied to the packaging laminated material 1, if necessary, by a pull-tab applicator. The packaging laminated material 1 is transferred to a sterilizing tank 4, and is sterilized in sterilizing tank 4 with a sterilizing liquid of hydrogen peroxide and the like. The packaging laminated material 1 is carried to an air knife 5 to be dried by the air knife 5. The packaging laminated material 1 is carried into an aseptic chamber 40 assuring that liquid food is filled up the tube-like packaging material with the aseptic atmosphere. The packaging laminated material 1 is transformed gradually with forming rings 6, and other forming rings to be formed to the tube-like shape.

The tube-like packaging laminated material 1 is preheated by hot air from a preheat means 8 of a longitudinal seal device to be sealed longitudinally. The liquid food is filled up into the tube-like packaging laminated material 1 from a bottom end of a filling pipe 7 outlet.

An example of filling up liquid food to the predetermined liquid level from a filling pipe in a tube-like packaging material is shown in FIG. 5.

A vertical portion of the filling pipe 7 is inserted into the internal lower part of the tube-like packaging material 1. The upstream portion is connected to a control valve 32. A cylindrical float 34 is arranged around the periphery of the vertical portion of the filling pipe 7. The float 34 floating in the liquid food and being between the tube packaging material 1 and the filling pipe 7 is put around the external surface of the vertical portion of the filling pipe 7 with freely up-down movability. A means to be detected 35 (a magnet, a transmitter, a tag and the like) is installed to the float 34. A detector 31 is arranged in the outside of the tube 1. The detector 31 converts a change of the strength and the weakness of signal from the means to be detected into electric current and the detector outputs as the electric signal. The detector outputs a stop signal at more than the predetermined level and an open signal at less than the predetermined level, respectively, to a controlling means 33. A flow control valve 32 is equipped in the upstream portion of the filling pipe 7, and the flow control valve 32 is controlled by the control means 33.

A liquid level of the liquid is coordinated to the predetermined level. (Referred Patent Documents 1)

The tube-like packaging laminated material 1 is guided downward and is carried to the transversal seal device 10, as shown in FIG. 4. The tube-like packaging laminated material 1 is heat-sealed with press along the transverse direction, and it is formed as a container shape. The transversal sealed packaging laminated material is cut with a knife and a pillow-like preliminary container (preformed body) 13 is formed.

Detailed partial cross-sectional view of the transversal seal device 10 is shown for FIG. 6. At first, in this embodiment, the tube-like packaging material 1 with the filled food is held with an upper pair of a seal jaw 10a and a facing jaw 11. While the tube-like packaging material 1 is carried downward for a distance of the length corresponding to only one packaged container, it is held by a pair of upper forming flaps 41 and 41, and it is formed as an approximate container shape. Two transversal seal zones are formed by the transversal sealing transversally. The middle of the seal zones of the connected pillow-like preforming bodies is cut by the knife 42, and separated pillow-like preformed bodies 13 are formed.

In the embodiment shown in FIG. 6, for high-speed transversal sealing, preforming and cutting, two pairs of the seal jaw and the facing jaw, and forming flaps are equipped and, the first pair which finished the transversal sealing, preforming and cutting steps is evacuated aside, and it returns upward, next transversal sealing, preforming and cutting steps are repeated.

The preliminary container 13 is conveyed and is formed to the final shape by a final forming device 15, as shown in FIG. 4, and a liquid-food filled packaged container 14 is produced.
[Patent Documents 1]
JP 01-82102 Y

SUMMARY OF THE INVENTION

Problem to be Solved by the Invention

In the above-mentioned packaging and filling system, pressure of liquid food filled in the tube is positive pressure corresponding to a depth of the liquid from the liquid level. When the packaging material is formed with the forming flaps, the positive pressure of the liquid food in the tube is combined with an external pressure of the forming flaps to form the packaging material well.

In addition, keeping such positive pressure keeps the filled foods good hygienic conditions, too. That is, even if the packaging material has slight cracks, cracking and pinholes, the liquid food leaks from such points only outside, but any outside atmosphere substance does not invade the tube and does not pollute the liquid food in the tube.

It is an object of the invention to provide with a packaging and filling machine capable of easily preforming with the forming flaps by keeping the pressure of the filled liquid food in the tube the positive pressure, capable of preventing the pressure of the liquid food from dropping to negative pressure, even if the pressure of the liquid food decreases due to the changes of the liquid food pressure, and capable of preventing outside atmosphere materials from invading into the tube.

Means to Solve the Problem

In a packaging and filling machine of this invention, a web-like packaging laminated material is spliced in a splice of next web-like packaging laminated material, the web-like packaging material is fed continually and is formed to tube shapes, the tube overlapped in both ends of the packaging material is longitudinally sealed along the longitudinal direction, liquid food is filled up to a liquid level of a predetermined position above an outlet of a filling pipe from the filling pipe in the tube-like packaging material conveyed continually and vertically downward, while the tube is held with seal jaws and counter jaws along transversal direction below the liquid level, and is pulled down, the tube is transversally sealed, while the tube is held with seal jaws and counter jaws along transversal direction below the liquid level, and the tube is held with forming flaps at the same time to be preformed, the tube is cut in the transversal seal zone, and packaged containers are manufactured, characterized in that;
the packaging and filling machine comprises a pressure flange and a positive pressure keeping means, the pressure flange is arranged around the periphery of filling pipe below the liquid level in the tube-like packaging material, the pressure flange controls free flows from the lower part to the upper part about the liquid food filled in the tube to keep the pressure of the liquid food in the tube below the pressure flange a positive pressure, and to make the preforming with forming flaps easy, the positive pressure keeping means absorbs fluctuation of the pressure of the liquid food in the tube below the pressure flange, and prevents the liquid food pressure from dropping in negative pressure to keep the pressure of the liquid food in the tube below the pressure flange a positive pressure.

In preferable embodiment of this invention, the positive pressure keeping means moves freely up and down on the periphery of the filling pipe. The positive pressure keeping means is the pressure flange located in the predetermined position and in the vicinity thereof by a balance with the first force moving downward by the flange's own weight and the second force moving upward by upstream of the liquid food flowing from the lower part to the upper part.

In preferable embodiment of this invention, the positive pressure keeping means moves freely up and down on periphery of the filling pipe. The positive pressure keeping means is the pressure flange located in the predetermined position and in the vicinity thereof by balance with the first force moving downward by magnetic force between internal and external magnetic poles of the tube and the second force moving upward by upstream of the liquid food flowing from the lower part to the upper part.

In preferable embodiment of this invention, the positive pressure keeping means is the pressure flange fixed on the periphery of the filling pipe, having a passing hole, and having a unidirectional valve in the passing hole to flow the liquid food downward from the upper part at the step that the liquid food pressure drops, and to control upward flow from the lower part of the liquid food at the other steps.

In preferable embodiment of this invention, an adding adjustment means of the positive pressure keeping means adds the liquid food into the tube of the filling pipe at the lower position, or the upper position and the lower position about the pressure flange lower is equipped. The adding adjustment means absorbs decrease of the liquid food pressure to the negative pressure by periodical fluctuation of the liquid food pressure, and prevents any outside atmosphere substance from making an invasion into the tube.

In preferable embodiment of this invention, a portion dropping the liquid food pressure by fluctuation of liquid food pressure is a first dropping portion above the seal jaws, counter jaws and forming flaps, as well as at least below the pressure flange. The adding adjustment means of the positive pressure keeping means is a hole or a unidirectional valve penetrating the tube wall of the filling pipe accepting a periodical fluctuation of the liquid food pressure of at least the first dropping portion.

In preferable embodiment of this invention, a flow control means of the positive pressure keeping means is equipped in the pressure flange. The flow control means controls the flow of the liquid food from the lower portion to the upper portion about the pressure flange, opens up the flow of the liquid food from the upper portion to the lower portion about the pressure flange, and absorbs decrease of the liquid food pressure to negative pressure to prevent outside atmosphere substance from making an invasion into the tube.

In preferable embodiment of this invention, the flow control means of the positive pressure keeping means is a ring-like floating valve arranged below the pressure flange around the periphery of the filling pipe with free up-and-down mobility according to the flow of the liquid food. The pressure flange has a passing hole penetrating through the flange and the ring-like floating valve opens or blocks the passing hole according to the flow of the liquid food, partially or totally.

In preferable embodiment of this invention, the positive pressure keeping means raises the pressure of the atmosphere in an aseptic chamber, raises the liquid food pressure through the liquid level, and absorbs decrease of the liquid food pressure to negative pressure to prevent outside atmosphere substance from making an invasion into the tube.

Effects of Invention

According to the above-mentioned invention, the following action function is shown, and profitable effect is provided.

In a packaging and filling machine of this invention, a web-like packaging laminated material is formed to tube shapes, the tube overlapped in both ends of the packaging material is longitudinally sealed along the longitudinal direction, liquid food is filled up to a liquid level of a predetermined position above an outlet of a filling pipe from the filling pipe in the tube-like packaging material conveyed continually and vertically downward, while the tube is held with seal jaws and counter jaws along transversal direction below the liquid level, the tube is held with forming flaps at the same time to be preformed, the tube is cut in the transversal seal zone, and packaged containers are manufactured, Since the web-like packaging laminated material is spliced in a splice of next web-like packaging laminated material, when remaining amount of the web-like packaging material is low, the packaging can be filled up continually without stopping.

Because it is transversal sealed below the liquid level of the web-like packaging material which liquid food was filled up with, unnecessary air does not stay in a container, and good quality is kept. In the packaging and filling, the pressure of the liquid food filled in the tube is positive pressure corresponding to depth of the liquid from the liquid level. When the packaging material is formed with the forming flaps, the material can be formed well below such positive pressure.

In the characteristic of this invention, the pressure flange is arranged on the periphery of the filling pipe below the liquid level in the tube-like packaging material.

While the tube-like packaging material is carried downward, the material is caught rapidly by the seal jaw and the counter jaw, and, in addition, the material is caught rapidly by a pair of the forming flaps. The liquid in the tube-like packaging material is pushed, and the pressure of the liquid food in the tube suddenly rises, and the positive pressure may be excess pressure. The excessively positive pressure rapidly raises the liquid level, and makes an unstable shakes and a difficulty of the liquid level control.

That is, this excessively positive pressure rapidly raises the liquid level, and shakes the level uncertainly. For example, the float 34 shown in FIG. 5 is shacked up and down greatly, and, as a result, a control means 33 cannot control the level.

In the invention, the pressure flange controls the free flows from the lower part to the upper part of the liquid food filled in the tube to keep the pressure of the liquid food in the tube below the pressure flange the proper positive pressure, and to make the preforming with forming flaps easy. In addition, even if the liquid food flows backwards from the lower portion to the upper portion, the backward flow can be controlled, and the rapid rise of the liquid level can be controlled. Because the liquid food pressure does not decrease to negative pressure, the invasion of the outside atmosphere substance into the tube can be prevented.

For example, the pressure flange 36 is arranged on the periphery of filling pipe 1 below the liquid level in the tube-like packaging material 1 as shown in FIG. 5.

Even if the liquid food flows backwards from the lower portion to the upper portion by rapid holding of the seal jaws and counter Jaws below the pressure flange and by rapid holding with a pair of the forming flaps, the pressure flange 36 can control the backward flow, and control the rapid rise of the liquid level, and keep the pressure of the liquid food in enough positive pressure.

By the fluctuation of the liquid food pressure, the pressure of the liquid food filled in the tube in a tube around the pressure flange is in danger of being extremely low positive pressure or negative pressure. FIG. 2 shows general examples of the feed of the liquid food from the filling pipe 7 and the flow and movement of the liquid food in the transversal seal with the seal jaw, the counter jaw and the forming flaps.

As shown in FIG. 2 (A), while the tube-like packaging material is carried to the lower portion in the direction of arrow c, the tube is rapidly caught by the forming flaps, the seal jaws 10a and the counter jaws 11, the liquid in the tube-like packaging material is pushed, and the pressure of the liquid food in the tube rapidly rises, and the liquid flows backwards in direction of arrow (a). The pressure flange 36 controls the backward flow, and keeps the positive pressure being necessary for forming.

Because the pressure of the liquid food in the tube pass on the whole liquid food in the tube regardless of the existence of the pressure flange 36, as shown in FIG. 2 (B), the liquid in the tube flows backwards in direction of the arrow (e) by inertia. However, liquid movement from the lower portion to the upper portion of the flange is disturbed by the existence of pressure flange 36, and the liquid is lacked above the flange (at the second dropping portion), and shortage (d) is produced. The shortage (d) is illustrated in FIG. 2 (B) as virtual foams. As a result, the pressure of the liquid food filled in the tube is in danger of being extremely low positive pressure or negative pressure. The raised liquid rapidly drops by the shortage, and, as a result, the pressure of the liquid food increases again. In this way the pitch is repeated with vibration.

In an example of the packaging and filling machine, FIG. 3 is a chart with a vertical axis showing the pressure of the liquid food above the pressure flange (the second dropping portion) and a cross axle showing time of one cycle of the transversal seal (holding with the seal jaws and the counter jaws), preforming and cutting steps.

The pressure of the liquid food in the tube rapidly rises when by the rapid holding with the forming flaps, the seal jaw and the counter (in the time period (j) indicated by arrow). They correspond to peaks (h) and (i) in FIG. 3.

The pressure of the liquid food in the tube passes on the whole liquid food in the tube and the liquid in the tube flow backwards by inertia to the upper portion. The liquid movement from the lower portion of the flange to the upper portion is disturbed by the existence of pressure flange 36, and the liquid is lacked above the flange (at the second dropping portion), the pressure of the liquid food above the pressure flange (at the second dropping portions) decreases. They are corresponding to bottom (g) of the pressure of the liquid food. The raised liquid rapidly drops due to the above-mentioned shortage; as a result, the pressure of the liquid food rises again. In this way the pitch is repeated with vibration.

Sequentially, as shown in FIG. 2 (C), the tube-like packaging material 1 is downward carried in the direction of an arrow (c), and a volume in the tube-like packaging material at the position below the pressure flange 36 (at the first dropping portion) increases. The liquid above the pressure flange 36 is fed in the direction of the arrow (b) (FIG. 2 (C)), unless the liquid food corresponding to the volume increment is fed by the filling pipe exit 7a. However, the pressure flange 36 disturbs the feed. As shown in FIG. 2 (C), the volume in the tube-like packaging material at the position below the pressure flange 36 (the first dropping portion) rapidly increases when the tube-like packaging material is pulled down by the seal jaw 10a and the counter jaw 11.

The fed amount of the liquid food is lacked, and the shortage (d) forms. The shortage (d) is illustrated in FIG. 2 (C) as virtual foams. As a result, the pressure of the liquid food filled in the tube is in danger of being extremely low positive pressure or negative pressure.

In an example of the packaging and filling machine, FIG. 7 is a chart with a vertical axis showing the pressure of the liquid food below the pressure flange (the first dropping portion) and a cross axle showing time of one cycle of the transversal seal (holding with the seal jaws and the counter jaws), preforming and cutting steps.

The pressure of the liquid food in the tube rapidly rises by the rapid holding with the forming flaps, the seal jaw and the counter (in the time period (j) indicated by arrow). (See FIG. 7 Peak (h))

The volume in the tube-like packaging material at the position below the pressure flange (the first dropping portion) rapidly increases when the tube-like packaging material is pulled down by the seal jaw and the counter jaw. The fed amount of the liquid food is lacked. The pressure of the liquid food filled in the tube is in danger of being extremely low positive pressure or negative pressure. (See FIG. 7 Bottom (g))

In the features of the invention, the positive pressure keeping means absorbs fluctuation of the pressure of the liquid food in the tube below the pressure flange, and prevents the liquid food pressure from dropping in negative pressure to keep the pressure of the liquid food in the tube below the pressure flange a positive pressure.

Because the positive pressure keeping means absorbs fluctuation of the pressure of the liquid food, and prevents the liquid food pressure from dropping in negative pressure to keep the pressure of the liquid food the positive pressure, the forming flaps can make the preforming easily, Because the liquid food pressure does not decrease to negative pressure, the invasion of the outside atmosphere substance into the tube can be prevented.

That is, because the positive pressure keeping means keeps the pressure of the liquid food the positive pressure, even if the packaging material has slight cracks, cracking and pinholes, the liquid food leaks from such points only outside, but any contaminant does not pollute the liquid food in the tube. The filled food is kept in the good hygienic conditions.

In the preferable embodiment of this invention, the positive pressure keeping means moves freely up and down on periphery of the filling pipe. The positive pressure keeping means is the pressure flange located in the predetermined position and in the vicinity thereof by a balance with the first force moving downward by the flange's own weight and the second force moving upward by upstream of the liquid food flowing from the lower part to the upper part.

When the tube is held rapidly by the seal jaws and the counter jaws, and the tube is caught rapidly by a pair of the forming flaps, the volume of the tube-like packaging material decreases for the rapid holding. The liquid food in the tube is about to rapidly rise, but the pressure flange controlling that the liquid food filled in the tube flows freely to the upper portion from the lower portion can control an upward-backward flow of the liquid food.

On the other hand, when the tube-like packaging material is pulled down at high speed, the volume below the pressure flange of the tube-like packaging material increases rapidly, and the liquid food amount to be fed is lacked, and the pressure of the liquid food in the tube drops. But, by the first force downward-moving by the pressure flange's own weight of the main body of stainless steel and the like, the volume below the pressure flange is decreased, and negative pressure can be prevented.

In preferable embodiment of this invention, the positive pressure keeping means moves freely up and down on periphery of the filling pipe. The positive pressure keeping means is the pressure flange located in the predetermined position and in the vicinity thereof by balance with the first force moving downward by magnetic force between internal and external magnetic poles of the tube and the second force moving upward by upstream of the liquid food flowing from the lower part to the upper part.

When the tube is held rapidly by pair of jaws, and the tube is caught rapidly by a pair of the forming flaps, the volume of the tube decreases for the rapid holding. The liquid food in the tube is about to rapidly rise, but the pressure flange controlling the liquid food's flow to the upper portion from the lower portion controls the upward-backward flow of the liquid food.

On the other hand, when the tube-like packaging material is pulled down at high speed, the volume below the pressure flange of the tube-like packaging material increases rapidly, and the liquid-food amount to be fed is lacked, and the pressure of the liquid food in the tube drops. But, by the first force downward-moving by the magnetic force, the volume below the pressure flange is decreased, and negative pressure can be prevented.

In preferable embodiment of this invention, the positive pressure keeping means is the pressure flange fixed on a periphery of the filling pipe, having a passage hole, and having a unidirectional valve in the passage hole to flow the liquid food downward from the upper portion at the step that the liquid food pressure drops, and to control upward flow from the lower part of the liquid food at the other steps.

When the tube is held rapidly by pair of jaws, and the tube is caught rapidly by a pair of the forming flaps, the volume of the tube decreases for the rapid holding. The liquid food in the tube is about to rapidly rise. But the pressure flange having a unidirectional valve controlling the liquid food's flow to the upper portion from the lower portion controls the upward-backward flow of the liquid food.

On the other hand, when the tube-like packaging material is pulled down at high speed, the volume below the pressure flange of the tube-like packaging material increases rapidly, and the liquid-food amount to be fed is lacked, and the pressure of the liquid food in the tube drops. But, by the unidirectional valve in the passage hole to flow the liquid food downward from the upper portion, the volume below the pressure flange is decreased, and negative pressure can be prevented.

In preferable embodiment of this invention, the positive pressure keeping means is an adding adjustment means adding the liquid food into the tube of the filling pipe at the lower position (at the first dropping portion), or at the upper portion (the second dropping portion) and lower position (at the first dropping portion) of the pressure flange, the adding adjustment means stops a drop to negative pressure of liquid food pressure by fluctuation of cycle of liquid food pressure more, and invasion of outside atmosphere substance to tube is prevented.

In the invention, the portions dropping the liquid food pressure by the fluctuation of the liquid food pressure comprise, above the seal jaws, the counter jaws and the forming flaps, the second dropping portion above the pressure flange and the first dropping portion below the pressure flange. In this invention, at least the portion below the pressure flange (the first dropping portion) is intended for.

Due to the dropping of the liquid food pressure, the liquid food flows to the second dropping portion and the first dropping portion according to differential pressure from the filling pipe. In preferable embodiment of this invention, the adding adjustment means is a unidirectional valve preventing the backward flow or a hole of a simple structure penetrating the tube wall of the filling pipe.

As the above-mentioned, the adding adjustment means stops the drop to negative pressure of the liquid food pressure by periodical fluctuation of the liquid food pressure, and invasion of the outside atmosphere substance to the tube is prevented.

Even if there are, in the longitudinal seal zone, the crack occurred in the splice and potential gaps, outside atmosphere substance, or any pollutant does not invade in the tube from the crack and the gap, and does not pollute the liquid food. Good hygiene state of the food is kept.

In preferable embodiment of this invention, a flow control means is equipped in pressure flange, the flow control means controls the flow of liquid food from the lower portion to the upper portion by the pressure flange, opens up the flow of the liquid food from the upper portion to the lower portion of the pressure flange, and absorbs decrease of the liquid food pressure to negative pressure to prevent outside atmosphere substance from making an invasion into the tube.

In preferable embodiment of this invention, the flow control means is a ring-like floating valve arranged below the pressure flange around the periphery of the filling pipe with freely up-and-down mobility according to the flow of the liquid food. The pressure flange has passing holes penetrating through the flange up and down. The ring-like floating valve opens or blocks the passing holes according to the flow of the liquid food, partially or totally.

The ring-like floating valve blocks the passing hole partially or totally, but there is a gap between the internal surface of the packaging material and outermost periphery of the pressure flange. Through the gap, some liquid food flows.

Cross-sectional shapes of the ring-like floating valve include easily manufacturable sectional cycle, sectional rectangle, upswing streamline (arc-like shape) driving flows from upper portion and downward dented shape controlling flows from lower portion, preferably the streamline and the downward dented shape.

With reference to FIG. 12, the operations and actions of the flow control means of the features of the invention is explained.

In the embodiment shown in FIG. 12, the flow control means 39 is provided below the pressure flange 36.

The flow control means 39 is a ring-like floating valve 39 arranged around the periphery of the filling pipe 7 with freely up-and-down mobility according to the flow (x, y, z) of the liquid food, The pressure flange 36 has the passing hole 36a penetrating through the flange up and down, the ring-like floating valve 39 opens the passing hole 36a (see FIG. 12. (B)), and blocks the passing hole 36a partially (see FIG. 12. (A)).

As shown in FIG. 12 (A), when the tube is rapidly caught by the forming flaps, the seal jaws 10a and the counter jaws 11, the liquid in the tube-like packaging material is pushed, and the pressure of the liquid food in the tube rapidly rises, and the liquid flows backwards in the upward direction (flow x) through the passing hole of the pressure flange 36.

The ring-like floating valve 39 rises according to the flow (flow (x)), and then the passing hole 36a of the pressure flange 36 is partially blocked.

As a result, the ring-like floating valve 39 controls the backward flow (flow (x)), and the pressure is kept in the positive pressure enough for the forming.

As shown in FIG. 12 (B), when the tube-like packaging material 1 is carried downward, the volume of the tube-like packaging material at the position below the pressure flange 36 increases.

The liquid food is fed by an outlet 7a of the filling pipe (flow (z)).

The liquid food is fed from the upper portion above the pressure flange 36 (flow (y)), unless the liquid food corresponding to the increased volume is fed by the outlet 7a of the filling pipe. When the fed liquid food is not enough, the pressure of the liquid food might be very low positive pressure or negative pressure.

The ring-like floating valve 39 moves downward according to the flow (y), and the passing hole 36a of the pressure flange 36 is opened up totally. (See FIG. 12 (B))

As a result, the feed becomes enough, and the pressure of the liquid food is raised, and the low positive pressure and the negative pressure are prevented beforehand.

As the above-mentioned, the flow control means stops the drop to negative pressure of the liquid food pressure by periodical fluctuation of the liquid food pressure, and invasion of the outside atmosphere substance to the tube is prevented.

Even if there are, in the longitudinal seal zone, the crack occurred in the splice and potential gaps, outside atmosphere substance, or any pollutant does not invade in the tube from the crack and the gap, and does not pollute the liquid food. Good hygiene state of the food is kept.

In preferable embodiment of this invention, the positive pressure keeping means raises the pressure of the atmosphere in an aseptic chamber, and raises the liquid food pressure through the liquid level, and absorbs decrease of the liquid food pressure to negative pressure to prevent outside atmosphere substance from making an invasion into the tube.

As far as securing of asepsis in the aseptic chamber, as for the pressure of the atmosphere in the aseptic chamber, normal pressure, the pressure lower than the normal pressure, and the pressure higher than the normal pressure are not trouble in function of a packaging and filling machine. Usually, the pressure in the aseptic chamber is set for some high pressure than normal pressure, and the aseptic chamber is kept aseptic by exhausting aseptic air from the aseptic chamber through gaps continuously.

In this invention, the pressure of the atmosphere in the aseptic chamber is further raised in order to raise the pressure of the liquid food. The pressure of the atmosphere in the aseptic chamber is applied through an opening of the upper part of the tube and the liquid level. A level of the pressure is modified appropriately, according to various kinds of parameter such as gas tight of the aseptic chamber, kinds of the liquid food, temperature of the liquid food.

With reference to FIG. 13, the features of this invention to elevate the pressure of the atmosphere in the aseptic chamber are explained. The aseptic chamber 40 of the illustrated packaging and filling machine covers the sterilized web-like packaging material 1 being conveyed, the tube-like packaging material 1, the upper part opening of the tube-like packaging material 1 and filling pipe 7. The chamber is filled by sterilized air flowing from venting opening 38 connected with sterilized air feeder 39.

From relation with the ventilation pressure of the sterilized air feeder 39 and gap 40a of the points where the tube-like packaging material 1 leaves from an aseptic chamber downward, the pressure of the atmosphere in the aseptic chamber is fixed.

That is, by making air-tightness of gap 40a, and by strengthening ventilation pressure, the pressure of the atmosphere in the aseptic chamber is raised, and is adjusted.

As the above-mentioned, the elevated pressure of the atmosphere in the aseptic chamber stops the drops to negative pressure of the liquid food pressure by periodical fluctuation of the liquid food pressure, and invasion of the outside atmosphere substance to the tube is prevented.

Even if there are, in the longitudinal seal zone, the crack occurred in the splice and potential gaps, outside atmosphere substance, or any pollutant does not invade in the tube from the crack and the gap, and does not pollute the liquid food. Good hygiene state of the food is kept.

As the above-mentioned, a packaging and filling machine of the invention is capable of easily preforming with the forming flaps by keeping the pressure of the filled liquid food in the tube the positive pressure, is capable of preventing the pressure of the liquid food from dropping to negative pressure, even if the pressure of the liquid food decreases due to the up-and-down of the liquid food pressure, and is capable of preventing outside atmosphere materials from invading into the tube.

DESCRIPTION OF THE MARK

Figure 1:
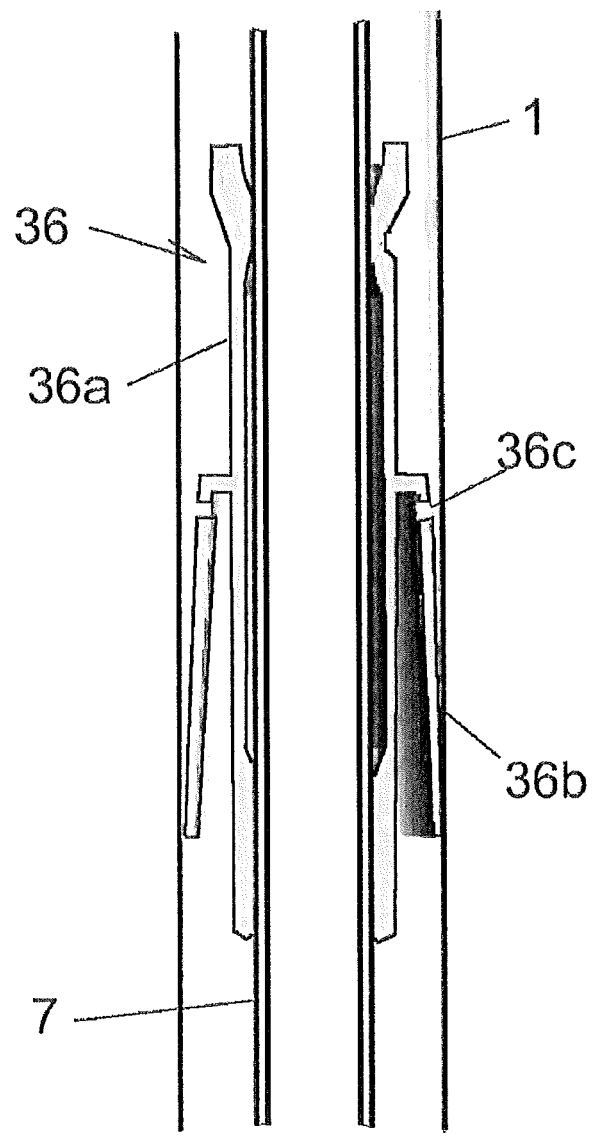
FIG. 1 is a sectional front view explaining an operation of the pressure flange of Example 1 of the packaging and filling machine in accordance with this invention.
Figure 2:
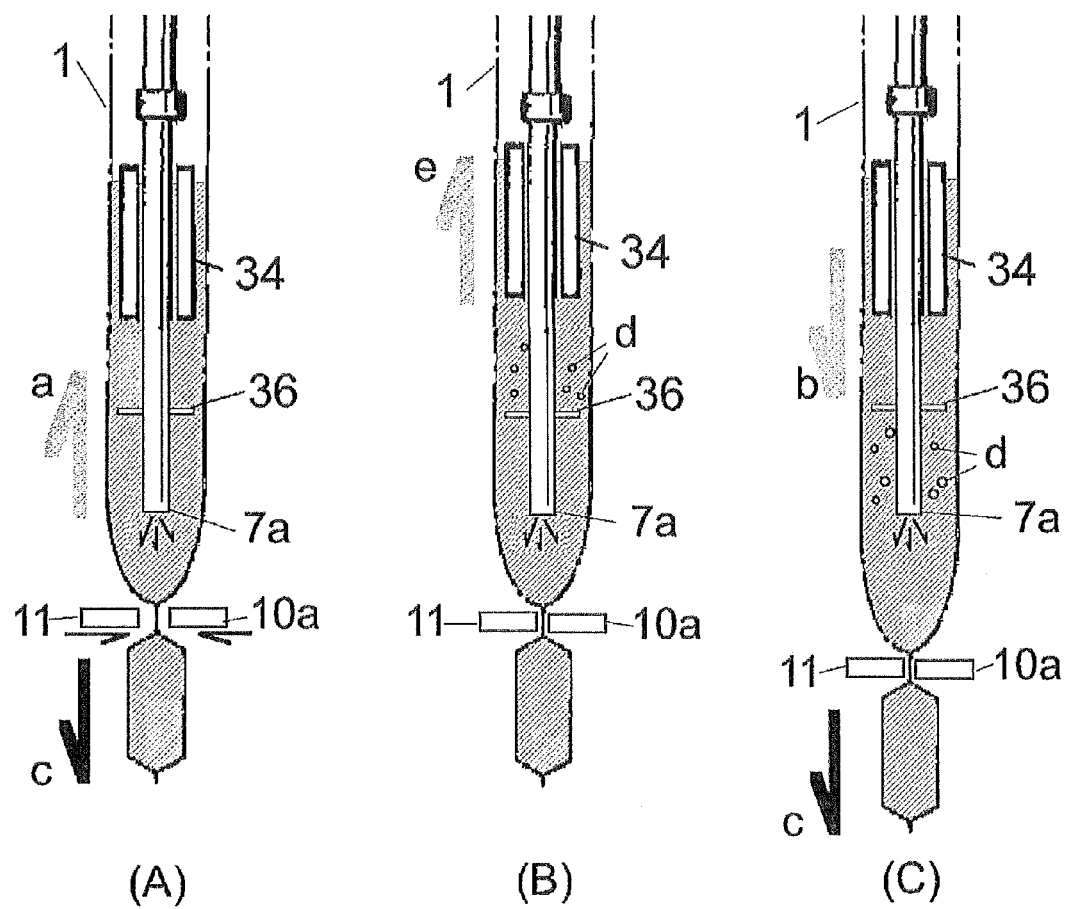
FIG. 2 is an outline sectional view showing the operation of the packaging and filling machine of the neighborhood of the pressure flange.

1 . . . tube-like packaging material
7 . . . filling pipe
10 . . . seal jaw
11 . . . counter jaw
31 . . . liquid level detecting means
32 . . . feeding means
33 . . . control means
34 . . . float
36 . . . pressure flange
37 . . . liquid level
39$a$ . . . adding adjustment means
39$b$ . . . ring-like floating valve
39$c$ . . . sterilized air feeder
40 . . . aseptic chamber

DESCRIPTION OF PREFERRED EMBODIMENTS

Modes of this working of invention are explained in detail as follows with reference to the drawings.

Figure 4:
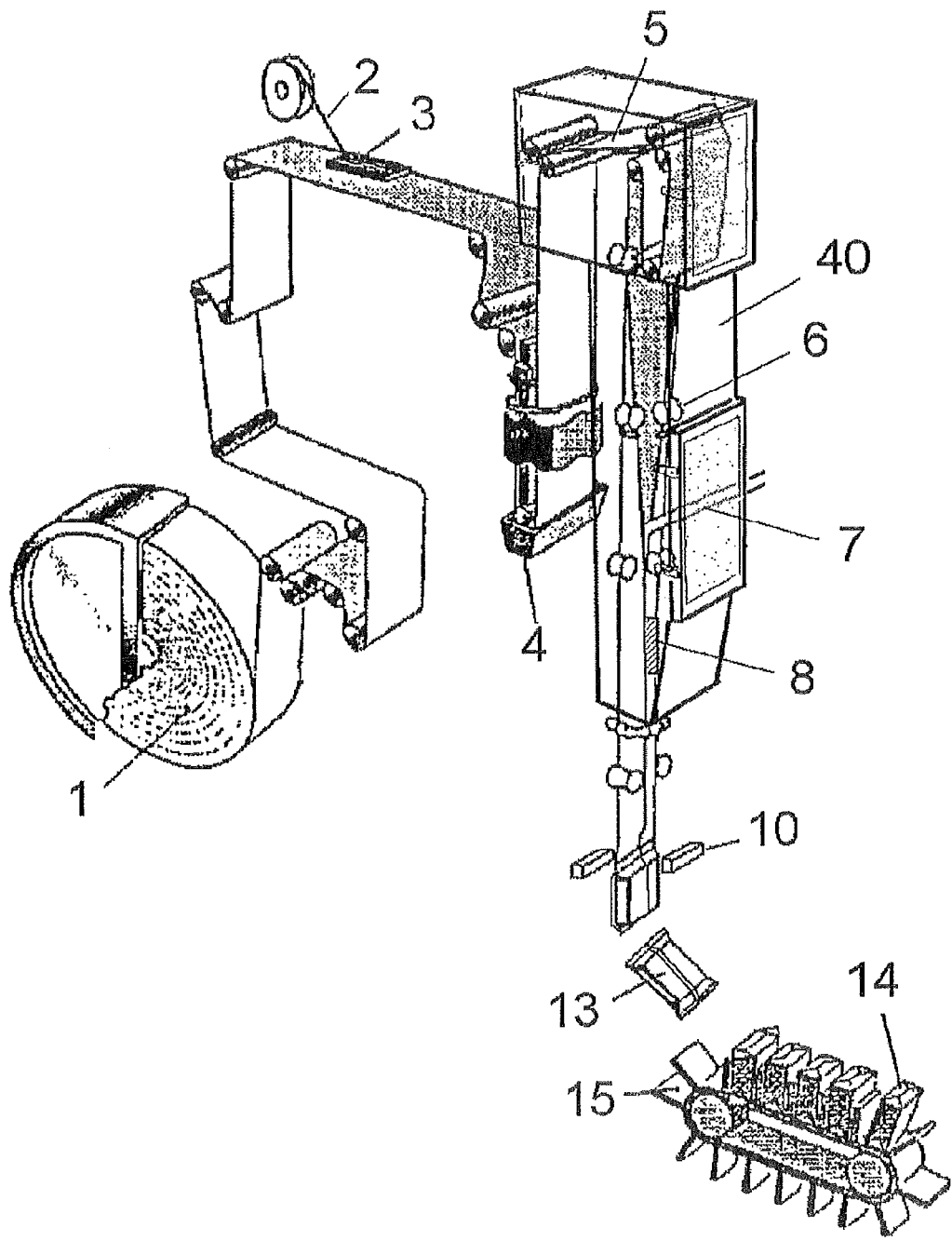
FIG. 4 is an outline perspective view showing an example of the packaging and filling machine usable in this invention.
Figure 5:
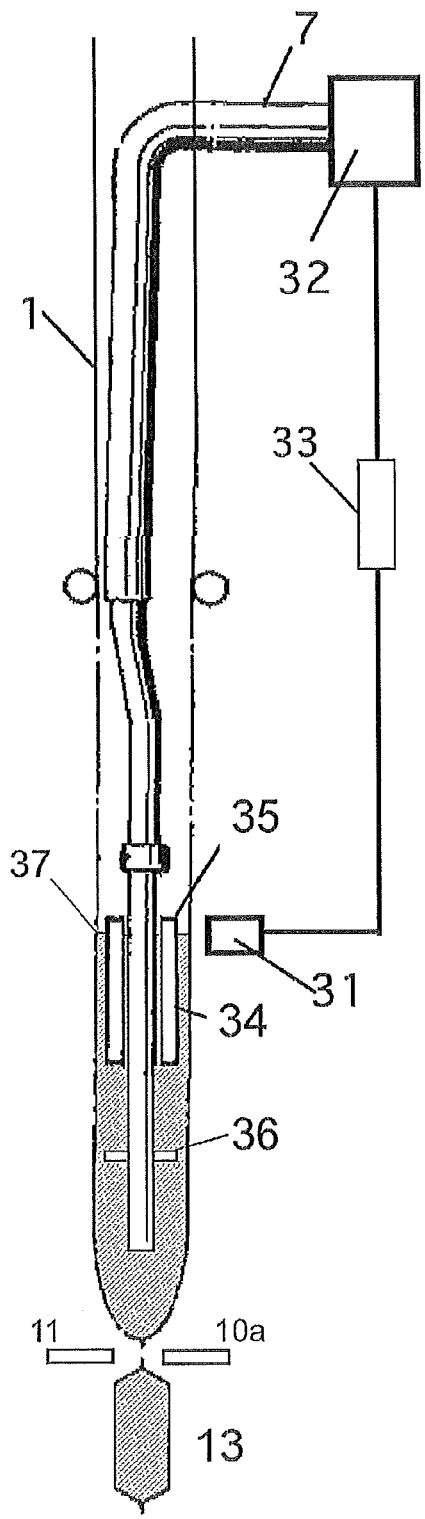
FIG. 5 is a sectional front view explaining a liquid level control of the packaging and filling machine.
Figure 6:
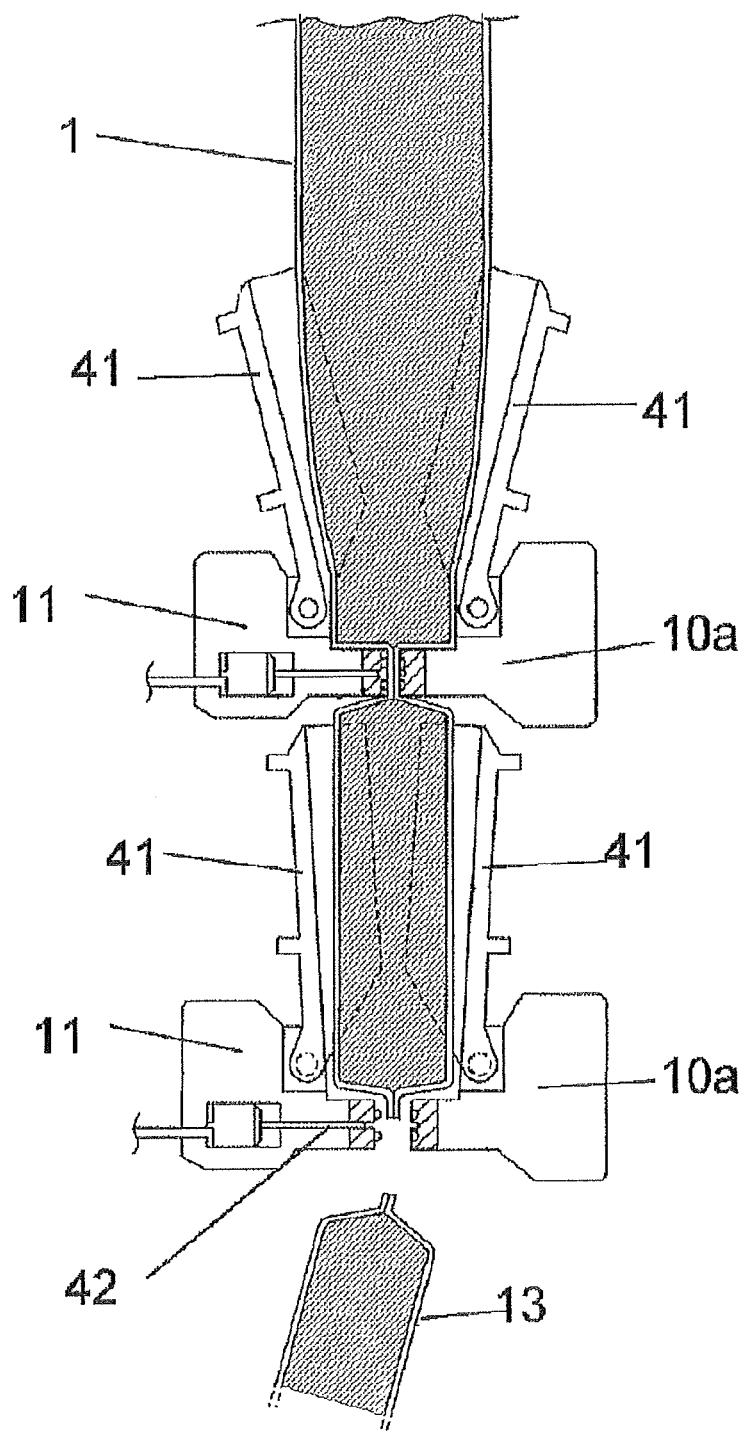
FIG. 6 is a sectional front view explaining the transversal seal device of the packaging and filling machine.

In the packaging and filling machine of this mode, as shown in FIG. 4, the web-like packaging laminated material 1 is formed to tube shape, the tube overlapped in both ends of the packaging material is longitudinally sealed along the longitudinal direction, as shown in FIG. 5, liquid food is filled up to a liquid level of a predetermined position above the outlet of filling pipe 7 from the filling pipe 7 in the tube-like packaging material conveyed vertically downward in the aseptic chamber 40, while the tube is held with seal jaws 10 and counter jaws 11 along transversal direction, as shown in FIG. 6, the tube 1 is transversally sealed, the tube is held with forming flaps 41, 41 at the same time to be preformed, the tube is cut in the transversal seal zone with knife 42, and preformed containers 13 are manufactured.

Example

A section of the pressure flange of the packaging and filling machine of Example 1 of the packaging and filling machine of this invention is shown in FIG. 1.

In this embodiment, the positive pressure keeping means moves freely up and down on periphery of the filling pipe 7. The positive pressure keeping means is the pressure flange located in the predetermined position and in the vicinity thereof by a balance with the first force moving downward by the flange's own weight and the second force moving upward by upstream of the liquid food flowing from the lower part to the upper part.

The pressure flange 36 of this embodiment has main body of a flange 36$a$ moving freely up and down on periphery of the filling pipe 7, and a flange wing 36$b$ having an opening part in the lower portion and a passing hole 36$c$ in the upper portion.

When the tube is held rapidly by the seal jaws and the counter jaws, and the tube is caught rapidly by a pair of the forming flaps, the volume of the tube-like packaging material decreases for the rapid holding. The liquid food in the tube is about to rapidly rise, but the flange wing 36$b$ can control the backward flow of the liquid food.

On the other hand, when the tube-like packaging material is pulled down at high speed, the volume of the tube-like packaging material below the pressure flange increases rapidly, and the pressure of the liquid food in the tube drops. But, because the liquid food passes the passing hole 36$c$ from upper portion to lower portion, by the pressure flange's own weight of the main body of stainless steel and the like, the volume below the pressure flange is decreased, and negative pressure can be prevented.

Figure 8:
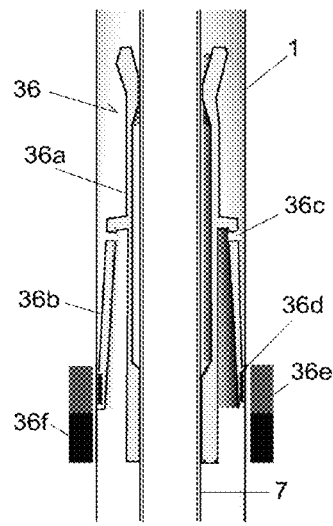
FIG. 8 is a partially sectional front view briefly explaining the float of Example 2 of the packaging and filling machine in accordance with this invention.

A section of the pressure flange of the packaging and filling machine of the second Example according this invention is shown in FIG. 8.

In this embodiment, the positive pressure keeping means moves freely up and down on periphery of the filling pipe 7. The positive pressure keeping means is the pressure flange located in the predetermined position and in the vicinity thereof by balance with the first force moving downward by magnetic force between internal and external magnetic poles (36$d$, 36$e$, 36$f$) of the tube and the second force moving upward by upstream of the liquid food flowing from the lower portion to the upper portion.

The pressure flange 36 of this embodiment has a main body 36a of the flange moving freely up and down on periphery of the filling pipe 7, a flange wing 36b having an opening part in the lower portion, a passing hole 36c in the upper portion and magnets 36d embedded in lower portion. Furthermore, in the outside of tube 1, the magnets with the homo-pole magnetic pole 36e of the inside magnetic pole 36d and the opposite-pole magnetic pole 36f are provided.

When the tube is held rapidly by the seal jaws and the counter jaws, and the tube is caught rapidly by a pair of the forming flaps, the volume of the tube-like packaging material decreases for the rapid holding. The liquid food in the tube is about to rapidly rise, but the flange wing 36b can control the backward flow of the liquid food.

On the other hand, when the tube-like packaging material is pulled down at high speed, the volume of the tube-like packaging material below the pressure flange increases rapidly, and the pressure of the liquid food in the tube drops. But, because the liquid food passes the passing hole 36c from upper portion to lower portion, the flange moves by magnetic force of the magnetic pole (36d and 36f) downward, the volume below the pressure flange is decreased, and negative pressure can be prevented.

Figure 9:
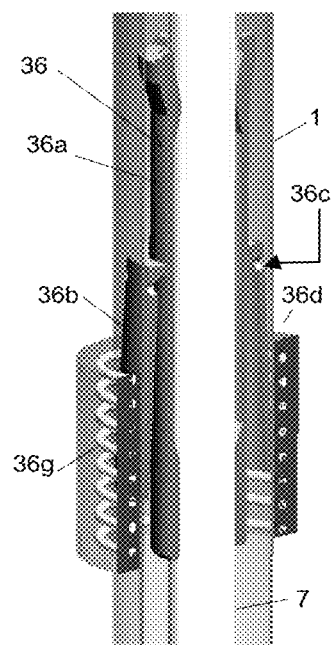
FIG. 9 is a sectional front view explaining an operation of the pressure flange by Example 3 of the packaging and filling machine in accordance with this invention.

A section of the pressure flange of the packaging and filling machine of the third Example according this invention is shown in FIG. 9.

In this embodiment, the positive pressure keeping means moves freely up and down on periphery of the filling pipe 7. The positive pressure keeping means is the pressure flange located in the predetermined position and in the vicinity thereof by balance with the first force moving downward by magnetic force between internal and external magnetic poles (36d, 36g) of the tube and the second force moving upward by upstream of the liquid food flowing from the lower portion to the upper portion.

The pressure flange 36 of this embodiment has a main body 36a of the flange moving freely up and down on periphery of the filling pipe 7, and the flange wing 36b having an opening part in the lower portion, a passing hole 36c in the upper portion and magnets 36d embedded in lower portion. Furthermore, an electromagnet 36g in the outside of tube 1 is provided.

When the tube is held rapidly by the seal jaws and the counter jaws, and the tube is caught rapidly by a pair of the forming flaps, the volume of the tube-like packaging material decreases for the rapid holding. The liquid food in the tube is about to rapidly rise, but the flange wing 36b can control the backward flow of the liquid food.

On the other hand, when the tube-like packaging material is pulled down at high speed, the volume of the tube-like packaging material below the pressure flange increases rapidly, and the pressure of the liquid food in the tube drops. But, because the liquid food passes the passing hole 36c from upper portion to lower portion, the flange moves by magnetic force of the magnetic pole (36d and 36g) downward, the volume below the pressure flange is decreased, and negative pressure can be prevented.

Figure 10:
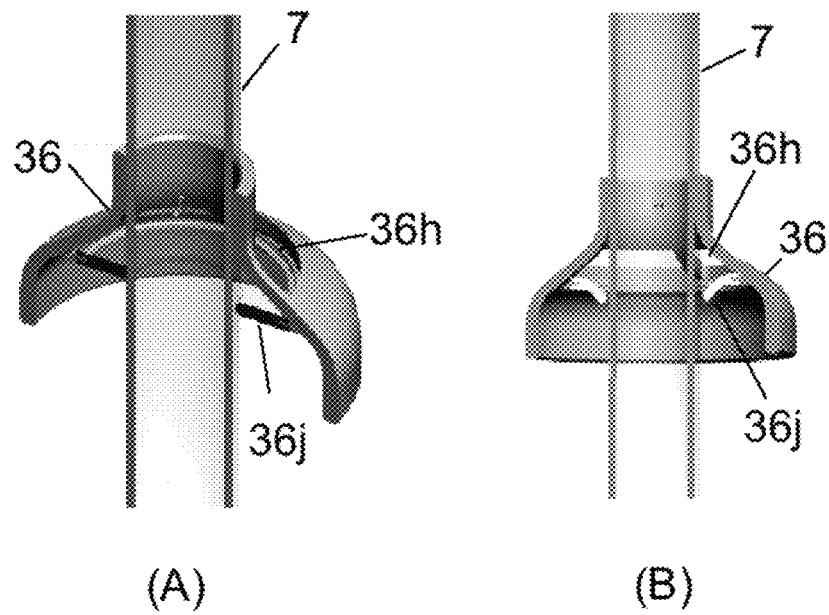
FIG. 10 is a sectional front view explaining an operation of the pressure flange by Example 4 of the packaging and filling machine in accordance with this invention.

A section of the pressure flange of the packaging and filling machine of the fourth Example according this invention is shown in FIG. 10.

In preferable embodiment of this invention, the positive pressure keeping means is the pressure flange fixed on a periphery of the filling pipe 7, having a passage hole 36h, and having a unidirectional valve 36j in the passage hole 36h to flow the liquid food downward from the upper part at the step that the liquid food pressure drops, and to control upward flow from the lower part of the liquid food at the other steps.

When the tube is held rapidly by pair of jaws, and the tube is caught rapidly by a pair of the forming flaps, the volume of the tube decreases for the rapid holding. The liquid food in the tube is about to rapidly rise. But the pressure flange having a unidirectional valve 36j controlling the liquid food's flow to the upper portion from the lower portion controls the upward-backward flow of the liquid food.

On the other hand, when the tube-like packaging material is pulled down at high speed, the volume below the pressure flange of the tube-like packaging material increases rapidly, and the liquid-food amount to be fed is lacked, and the pressure of the liquid food in the tube drops. But, by the unidirectional valve 36j in the passage hole to flow the liquid food downward from the upper portion, the liquid food is fed below the pressure flange 36, and negative pressure can be prevented.

As the above-mentioned, the pressure flange controls the free flows from the lower part to the upper part of the liquid food filled in the tube to keep the pressure of the liquid food in the tube below the pressure flange the proper positive pressure, and to make the preforming with forming flaps easy. In addition, even if the liquid food flows backwards from the lower portion to the upper portion, the backward flow can be controlled, and the rapid rise of the liquid level can be controlled.

Moreover, because the positive pressure keeping means keeps the pressure of the liquid food the positive pressure, even if the packaging material has slight cracks, cracking and pinholes, the liquid food leaks from such points only outside, but any contaminant does not pollute the liquid food in the tube. The filled food is kept in the good hygienic conditions.

As the above-mentioned, a packaging and filling machine of the invention is capable of easily preforming with the forming flaps by keeping the pressure of the filled liquid food in the tube the positive pressure, is capable of preventing the rapid rise of liquid level.

Figure 11:
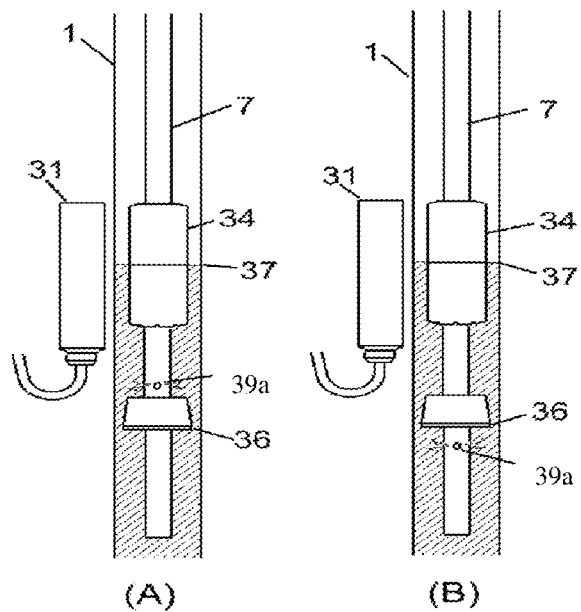
FIG. 11 is a sectional front view explaining an operation of the pressure flange by Example 5 of the packaging and filling machine of this invention.

An outline of the adding adjustment means of the fifth Example of the packaging and filling machine in accordance with this invention is shown in FIG. 11 (A).

The filling pipe 7 is inserted in the inside of the tube-like packaging material 1. The cylindrical float 34 is arranged to the surroundings outside the filling pipe 7. The float 34 floated in the liquid food is between the tube packaging material 1 and the filling pipe 7, and is put into the filling pipe 7 with freely up-down mobility. The detector 31 outside the tube 1 detects a position of the float 34.

In this example, sectional trapezoid-like pressure flange 36 is equipped below the liquid level in the tube-like packaging material 1, and is arranged on the filling pipe 7.

The pressure flange can keep the pressure of the liquid food in the tube below the pressure flange the proper positive pressure, and make the preforming with forming flaps easy. In addition, even if the liquid food flows backwards from the lower portion to the upper portion, the backward flow can be controlled, and the rapid rise of the liquid level can be controlled.

In this Example, the adding adjustment means 39a additionally feeds the liquid food in filling pipe 7 into the outside of the filling pipe 7 as well as into the inside of the tube 1 at the position above the pressure flange 36 (at the second dropping point). The adding adjustment means stops the drop to negative pressure of the liquid food pressure by periodical fluctuation of the liquid food pressure, and invasion of the outside atmosphere substance to the tube is prevented.

In this Example, the adding adjustment means 39a is two holes 39a of a simple structure penetrating the tube wall of the filling pipe 7.

An outline of the adding adjustment means of the sixth Example of the packaging and filling machine in accordance with this invention is shown in FIG. 11 (B).

The filling pipe 7 is inserted in the inside of the tube-like packaging material 1. The cylindrical float 34 is arranged to the surroundings outside the filling pipe 7. The float 34 floated in the liquid food is between the tube packaging material 1 and the filling pipe 7, and is put into the filling pipe 7 with freely up-down mobility. The detector 31 outside the tube 1 detects a position of the float 34.

In this example, sectional trapezoid-like pressure flange 36 is equipped below the liquid level in the tube-like packaging material 1, and is arranged on the filling pipe 7.

The pressure flange can keep the pressure of the liquid food in the tube below the pressure flange the proper positive pressure, and make the preforming with forming flaps easy. In addition, even if the liquid food flows backwards from the lower portion to the upper portion, the backward flow can be controlled, and the rapid rise of the liquid level can be controlled.

In this Example, the adding adjustment means 39a additionally feeds the liquid food in filling pipe 7 into the outside of the filling pipe 7 as well as into the inside of the tube 1 at the position below the pressure flange 36 (at the first dropping point). The adding adjustment means stops the drop to negative pressure of the liquid food pressure by periodical fluctuation of the liquid food pressure, and invasion of the outside atmosphere substance to the tube is prevented.

In this Example, the adding adjustment means 39a is two unidirectional valves 39a of a simple structure penetrating the tube wall of the filling pipe 7.

Figure 3:
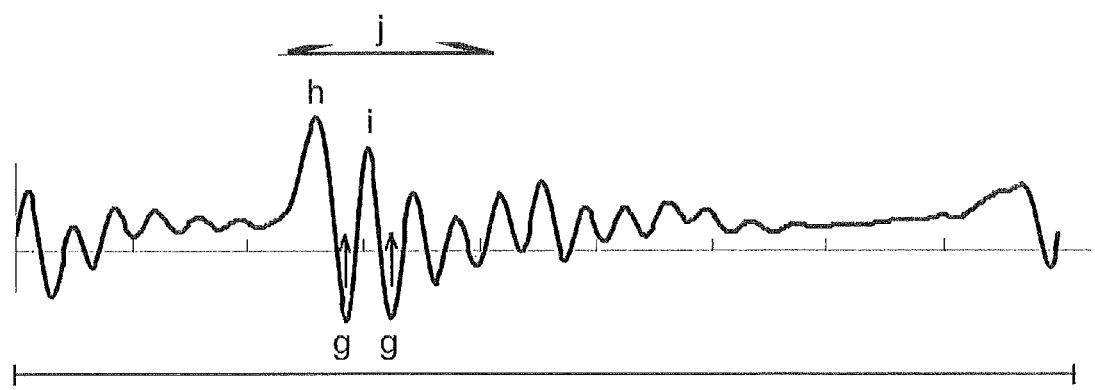
FIG. 3 is a chart with a vertical axis showing the pressure of the liquid food above the pressure flange (at the second dropping portion) in Example of the packaging and filling machine and a cross axle showing time of one cycle of the transversal seal (holding with the seal jaw and the counter jaw), preforming and cutting steps.
Figure 7:
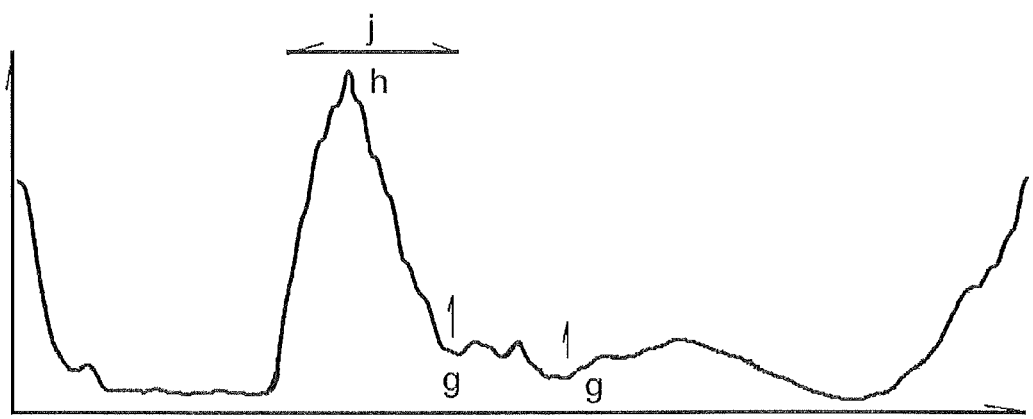
FIG. 7 is, in an example of the packaging and filling machine, a chart with a vertical axis showing the pressure of the liquid food below the pressure flange (the first dropping portion) and a cross axle showing time of one cycle of the transversal seal (holding with the seal jaws and the counter jaws), preforming and cutting steps.

In above Example, the bottoms (g) of the liquid food pressure as shown in FIG. 3 and FIG. 7 were improved in the direction of the arrow, and the liquid food pressure above the pressure flange 36 (at the second dropping point) raised by 30%.

In addition, other than the above Examples, the single or multi adding adjustment means can be arranged in both of the first dropping point and the second dropping point.

Figure 12:
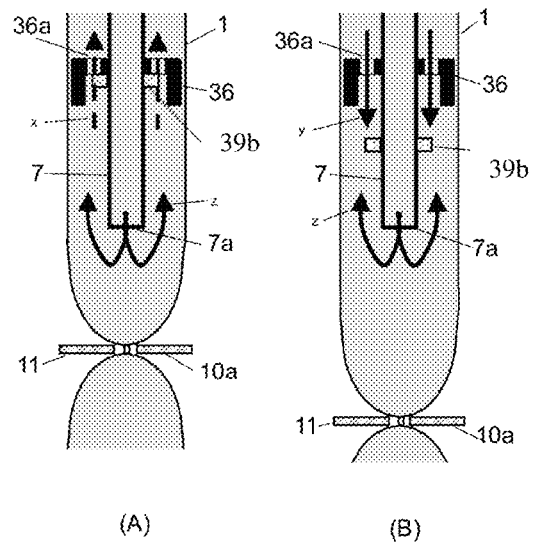
FIG. 12 is sectional front view explaining an operation of the pressure flange by Example 6 of the packaging and filling machine of this invention.

The outline of the flow control means of the seventh Example of the packaging and filling machine in accordance with this invention is shown in FIG. 12 (A), (B) and FIG. 5.

The filling pipe 7 is inserted in the inside of the tube-like packaging material 1. The cylindrical float 34 is arranged to the surroundings outside the filling pipe 7. The float 34 floated in the liquid food is between the tube packaging material 1 and the filling pipe 7, and is put into the filling pipe 7 with freely up-down mobility. The detector 31 outside the tube 1 detects a position of the float 34.

In this example, sectional trapezoid-like pressure flange 36 is equipped below the liquid level in the tube-like packaging material 1, and is arranged on the filling pipe 7.

The pressure flange 36 has a passing hole 36x penetrating up and down.

The pressure flange can keep the pressure of the liquid food in the tube below the pressure flange the proper positive pressure, and make the preforming with forming flaps easy. In addition, even if the liquid food flows backwards from the lower portion to the upper portion, the backward flow can be controlled, and the rapid rise of the liquid level can be controlled.

In this example, the ring-like floating valve 39 is equipped below the pressure flange 36.

The ring-like floating valve 39 is arranged around the periphery of the filling pipe 7 with freely up-and-down mobility according to the flow (x, y, z) of the liquid food.

The pressure flange 36 has the passing hole 36a penetrating through the flange up and down; the ring-like floating valve 39 opens the passing hole 36a, and blocks the passing hole 36a partially. As shown in FIG. 12 (A), when the tube is rapidly caught in the transversal sealing, the liquid is pushed, and the pressure of the liquid food in the tube rapidly rises, and the liquid flows backwards in the upward direction (flow (x)) through the passing hole 36a of the pressure flange 36. The ring-like floating valve 39 rises according to the flow (flow (x)), and then the passing hole 36a of the pressure flange 36 is partially blocked. As a result, the ring-like floating valve 39 controls the backward flow (flow (x)), and the pressure is kept in the positive pressure enough for the forming.

As shown in FIG. 12 (B), when the tube-like packaging material 1 is carried downward, the volume of the tube-like packaging material at the position below the pressure flange 36 increases. The ring-like floating valve 39 moves downward according to the flow (y), and the passing hole 36a of the pressure flange 36 is opened up totally.

As a result, the feed becomes enough, and the pressure of the liquid food is raised, and the low positive pressure and the negative pressure are prevented beforehand.

In above Example, the bottom (g) as shown in FIG. 7 was improved in direction of the arrow, and the liquid food pressure below the pressure flange 36 (at the first dropping point) was raided by 16%.

In addition, other than above ring-like floating valve, a unidirectional valve can be arranged in the passing hole.

Figure 13:
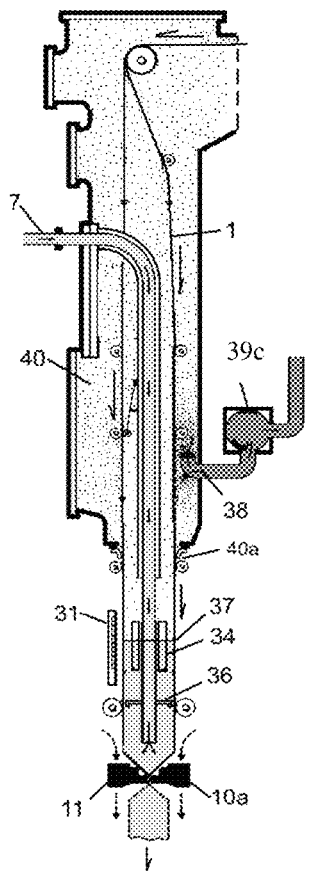
FIG. 13 is a sectional front view explaining an operation of the aseptic chamber by Example 7 of the packaging and filling machine of this invention.

The outline of the flow control means of the Example of the packaging and filling machine in accordance with this invention is shown in FIG. 13 and FIG. 5.

The filling pipe 7 is inserted in the inside of the tube-like packaging material 1. The cylindrical float 34 is arranged to the surroundings outside the filling pipe 7. The float 34 floated in the liquid food is between the tube packaging material 1 and the filling pipe 7, and is put into the filling pipe 7 with freely up-down mobility. The detector 31 outside the tube 1 detects a position of the float 34.

In this example, sectional plate-like pressure flange 36 is equipped below the liquid level in the tube-like packaging material 1, and is arranged on the filling pipe 7. In addition, it may be sectional trapezoid-like pressure flange. The pressure flange can keep the pressure of the liquid food in the tube below the pressure flange the proper positive pressure, and make the preforming with forming flaps easy.

In addition, even if the liquid food flows backwards from the lower portion to the upper portion, the backward flow can be controlled, and the rapid rise of the liquid level can be controlled.

In the embodiment, the positive pressure keeping means raises the pressure of the atmosphere in an aseptic chamber, and raises the liquid food pressure through the liquid level, and absorbs decrease of the liquid food pressure to negative pressure to prevent outside atmosphere substance from making an invasion into the tube.

The pressure of the atmosphere in the aseptic chamber is raised in order to raise the pressure of the liquid food.

The pressure of the atmosphere in the aseptic chamber is applied through an opening of the upper part of the tube and the liquid level.

A level of the pressure is modified appropriately, according to various kinds of parameter such as gas tight of the aseptic chamber, kinds of the liquid food, temperature of the liquid food.

The aseptic chamber 40 of the packaging and filling machine shown in FIG. 1 consists of air space covered by a chamber, is filled with sterilized air.

The sterilized web-like packaging material 1 is conveyed into the aseptic chamber 40, and the packaging material 1 is formed to tube-like shape, the tube-like packaging material 1 has an upper opening, and, in addition, the filling pipe 7 is inserted into the aseptic chamber.

The sterilized air is fed from venting opening 38 connected to a sterilized air feeder 39c. From balance with the ventilation pressure of the sterilized air feeder 39 and gap 40a of the points where the tube-like packaging material 1 leaves from an aseptic chamber downward, the pressure of the atmosphere in the aseptic chamber is fixed. That is, by making air-tightness of gap 40a, and by strengthening ventilation pressure, the pressure of the atmosphere in the aseptic chamber is raised, and is adjusted.

As a result, the elevated pressure in the aseptic chamber stops the drops to negative pressure of the liquid food pressure by periodical fluctuation of the liquid food pressure, and invasion of the outside atmosphere substance to the tube is prevented.

In above Example, the bottoms (g) shown in FIG. 3 and FIG. 7 were improved in direction of the arrow.

The foregoing description has been presented for purposes of illustration and description. It is not intended to be exhaustive or to limit the inventions to the precise embodiments disclosed. Obvious modifications or variations are possible in light of the above teachings.

INDUSTRIAL APPLICABILITY

By the packaging and filling machine of this invention, packaged containers for liquid foods such as milk, juice, mineral water, fluid diet product can be manufactured.

The invention claimed is:

1. A packaging and filling machine, in which a web-like packaging laminated material is spliced in a splice of next web-like packaging laminated material, the web-like packaging material is fed continually and is formed to a tube shape, the tube overlapped in both ends of the packaging material is longitudinally sealed along the longitudinal direction, liquid food is filled up to a liquid level of a predetermined position above an outlet of a filling pipe from the filling pipe in the tube-like packaging material conveyed continually and vertically downward, while the tube is held with seal jaws and counter jaws along transversal direction below the liquid level, and is pulled down, the tube is transversally sealed, while the tube is held with the seal jaws and the counter jaws along transversal direction below the liquid level, the tube is held with forming flaps at the same time to be preformed, the tube is cut in the transversal seal zone, and packaged containers are manufactured, the packaging and filling machine comprising:

a pressure flange and a positive pressure keeping means, the pressure flange being arranged around the periphery of the filling pipe below the liquid level in the tube-like packaging material, the pressure flange controlling free flows from the lower part to the upper part of the liquid food filled in the tube to keep the pressure of the liquid food in the tube below the pressure flange a positive pressure, and to make the preforming with forming flaps easy, the positive pressure keeping means absorbing fluctuation of the pressure of the liquid food in the tube below the pressure flange, and preventing the liquid food pressure from dropping in negative pressure to keep the pressure of the liquid food in the tube below the pressure flange a positive pressure, wherein a flow control means of the positive pressure keeping means is equipped in the pressure flange, the flow control means controls the flow of liquid food from the lower portion to the upper portion by the pressure flange, opens up the flow of the liquid food from the upper portion to the lower portion about the pressure flange, and absorbs decrease of the liquid food pressure to negative pressure to prevent outside atmosphere substance from making an invasion into the tube, and wherein the flow control means of the positive pressure keeping means is a ring-like floating valve arranged below the pressure flange around the periphery of the filling pipe with freely up-and-down mobility according to the flow of the liquid food, the pressure flange has a passing hole penetrating through the flange up and down, and the ring-like floating valve opens or blocks the passing hole according to the flow of the liquid food, partially or totally.

2. A packaging and filling machine according to claim 1, wherein the positive pressure keeping means moves freely up and down on the periphery of the filling pipe, and is the pressure flange located in the predetermined position and the vicinity thereof by a balance with the first force moving downward by the flange's own weight and the second force moving upward by upstream of the liquid food flowing from the lower part to the upper part.

3. A packaging and filling machine according to claim 1, wherein the positive pressure keeping means moves freely up and down on the periphery of the filling pipe, and is the pressure flange located in the predetermined position and the vicinity thereof by balance with the first force moving downward by magnetic force between internal and external magnetic poles of the tube and the second force moving upward by upstream of the liquid food flowing from the lower part to the upper part.

4. A packaging and filling machine according to claim 1, wherein the positive pressure keeping means is the pressure flange fixed on the periphery of the filling pipe, having a passage hole, and having a unidirectional valve in the passage hole to flow the liquid food downward from the upper part at the step that the liquid food pressure drops, and to control upward flow from the lower part of the liquid food at the other steps.

5. A packaging and filling machine according to claim 1, wherein an adding adjustment means of the positive pressure keeping means adding the liquid food into the tube of the filling pipe at a lower position or an upper position and a lower position of the pressure flange lower is equipped, the adding adjustment means absorbs decrease of the liquid food pressure to the negative pressure by periodical fluctuation of the liquid food pressure, and prevent any outside atmosphere substance from making an invasion into the tube.

6. A packaging and filling machine according to claim 5, wherein a portion dropping the liquid food pressure by fluctuation of liquid food pressure are a first dropping portions above the seal jaws, counter jaws and forming flaps, as well as at least below the pressure flange, the adding adjustment means of the positive pressure keeping means is a hole or a unidirectional valve penetrating the tube wall of the filling pipe accepting a periodical fluctuation of the liquid food pressure of at least the first dropping portion.

7. A packaging and filling machine according to claim 1, wherein the positive pressure keeping means raises the pressure of the atmosphere in an aseptic chamber, and raises the liquid food pressure through the liquid level, and absorbs decrease of the liquid food pressure to negative pressure to prevent outside atmosphere substance from making an invasion into the tube.

8. A packaging and filling machine, in which a web-like packaging laminated material is spliced in a splice of next web-like packaging laminated material, the web-like packaging material is fed continually and is formed to a tube shape, the tube overlapped in both ends of the packaging material is longitudinally sealed along the longitudinal direction, liquid food is filled up to a liquid level of a predetermined position above an outlet of a filling pipe from the filling pipe in the tube-like packaging material conveyed continually and vertically downward, while the tube is held with seal jaws and counter jaws along transversal direction below the liquid level, and is pulled down, the tube is transversally sealed, while the tube is held with the seal jaws and the counter jaws along transversal direction below the liquid level, the tube is held with forming flaps at the same time to be preformed, the tube is cut in the transversal seal zone, and packaged containers are manufactured, the packaging and filling machine comprising:

a pressure flange and a positive pressure keeping means, the pressure flange being arranged around the periphery of the filling pipe below the liquid level in the tube-like packaging material, the pressure flange controlling free flows from the lower part to the upper part of the liquid food filled in the tube to keep the pressure of the liquid food in the tube below the pressure flange a positive pressure, and to make the preforming with forming flaps easy, the positive pressure keeping means absorbing fluctuation of the pressure of the liquid food in the tube below the pressure flange, and preventing the liquid food pressure from dropping in negative pressure to keep the pressure of the liquid food in the tube below the pressure flange a positive pressure, wherein a flow control means of the positive pressure keeping means is a ring-like floating valve arranged below the pressure flange around the periphery of the filling pipe with freely up-and-down mobility according to the flow of the liquid food, the pressure flange has a passing hole penetrating through the flange up and down, and the ring-like floating valve opens or blocks the passing hole according to the flow of the liquid food, partially or totally.

* * * * *